U S007606412B2

(12) United States Patent  (10) Patent No.: US 7,606,412 B2
Huh et al. (45) Date of Patent: Oct. 20, 2009

(54) METHOD AND APPARATUS FOR GENERATING USER PREFERENCE DATA REGARDING COLOR CHARACTERISTIC OF IMAGE AND METHOD AND APPARATUS FOR CONVERTING IMAGE COLOR PREFERENCE USING THE METHOD AND APPARATUS

(75) Inventors: Young-sik Huh, Gyeonggi-do (KR); Du-sik Park, Gyeonggi-do (KR); Seong-deok Lee, Gyeonggi-do (KR); Ki-won Yoo, Seoul (KR); Won-hee Choi, Gyeongsangbuk-do (KR); Sang-kyun Kim, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 725 days.

(21) Appl. No.: 10/733,388

(22) Filed: Dec. 12, 2003

(65) Prior Publication Data

US 2004/0165769 A1 Aug. 26, 2004

(30) Foreign Application Priority Data

Dec. 12, 2002 (KR) ............ 10-2002-0079316
Dec. 5, 2003 (KR) ............ 10-2003-0087993

(51) Int. Cl.
*G06K 9/00* (2006.01)
(52) U.S. Cl. .................. 382/162; 348/97; 382/275
(58) Field of Classification Search .......... 382/162–172
See application file for complete search history.

(56) References Cited

U.S. PATENT DOCUMENTS 5,218,671 A 6/1993 Liao et al.
5,300,974 A 4/1994 Stephenson, III
5,874,988 A 2/1999 Gu
6,069,982 A * 5/2000 Reuman ............ 382/275
2001/0028736 A1* 10/2001 Pettigrew et al. ........ 382/162
2002/0164072 A1 11/2002 Jang et al.
2004/0013298 A1 1/2004 Choe et al.

FOREIGN PATENT DOCUMENTS

EP 0932108 A2 7/1999

(Continued)

OTHER PUBLICATIONS

Japanese Office Action dated Oct. 19, 2005.

(Continued)

*Primary Examiner*—Samir A. Ahmed
*Assistant Examiner*—Tsung-Yin Tsai
(74) *Attorney, Agent, or Firm*—Buchanan Ingersoll & Rooney PC

(57) ABSTRACT

A method and apparatus for generating user preference data regarding the color characteristic of an image is provided where a preference image comprises an image converted to have a color characteristic that a user prefers with respect to a predetermined reference image, a preference value comprises a color characteristic value of the preference image, and a reference value comprises a color characteristic value of the reference image. The method for generating user preference data comprises (a) obtaining an image color characteristic value of a preference image and a reference image, (b) generating {preference value, reference value} which corresponds to a pair of the preference value and the reference value, and (c) generating the pair {preference value, reference value} as preference meta-data having at least one feature block.

34 Claims, 6 Drawing Sheets

FOREIGN PATENT DOCUMENTS

| | | |
|---|---|---|
| JP | 09-55949 | 2/1997 |
| JP | 2000-209437 | 7/2000 |
| JP | 2001-251640 | 9/2001 |
| JP | 2002-10281 | 1/2002 |
| JP | 2002-010281 A | 1/2002 |
| JP | 2002-171522 | 6/2002 |
| JP | 2002-290986 | 10/2002 |
| JP | 2002-290986 A | 10/2002 |
| JP | 2002-536920 | 10/2002 |
| JP | 2002-334103 A | 11/2002 |
| JP | 2006-279969 A | 10/2006 |
| KR | 0046716 B1 | 6/2001 |
| KR | 0079348 A | 10/2002 |
| KR | 0058909 A | 7/2003 |

OTHER PUBLICATIONS

Chinese Office Action dated Mar. 10, 20006.
European Search Report (in English) issued by The Hague on Oct. 13, 2006 in corresponding EP Appln. No. 03257796.7, The Hague, The Netherlands.
Office Actions issued by Japanese Patent Office on Apr. 19, 2007.
Office Action issued by Japanese Patent Office on Jul. 8, 2008.
European Office Action issued Jan. 28, 2009 in corresponding EP Appln. No. 03257796.7
Office Action issued in corresponding Japanese Patent Application No. 2006-115401 dated Jul. 8, 2008.

* cited by examiner

METHOD AND APPARATUS FOR GENERATING USER PREFERENCE DATA REGARDING COLOR CHARACTERISTIC OF IMAGE AND METHOD AND APPARATUS FOR CONVERTING IMAGE COLOR PREFERENCE USING THE METHOD AND APPARATUS

BACKGROUND OF THE INVENTION

This application claims the priority of Korean Patent Application Nos. 2002-79316 filed on Dec. 12, 2002, 2003-87993 filed on Dec. 5, 2003, respectively, in the Korean Intellectual Property Office, the disclosures of which are incorporated herein in its entirety by reference.

1. Field of the Invention

The present invention relates to image processing, and more particularly, a method and apparatus for generating user preference data regarding the color characteristic of an image and a method and apparatus for converting image color preference using the method and apparatus.

2. Description of the Related Art

There are a variety of methods of converting images so that video has a better color characteristic when a user views video. There are color characteristics considered for conversion in the methods, such as brightness, saturation, contrast, and color temperature. In the methods, a color characteristic value of an input image is obtained, and then, the input image is converted so that input video has a target color characteristic value. However, the target color characteristic value is determined as desirable in each of the methods and is set collectively. Thus, in the methods, conversion which satisfies user's characteristics, cannot be performed.

SUMMARY OF THE INVENTION

The present invention provides a method and apparatus for generating user preference data regarding the color characteristic of an image, in which a conversion target value is set according to user characteristics.

The present invention also provides a method and apparatus for converting image color preference using user preference data regarding the color characteristic of an image.

The present invention also provides a recording medium on which user preference data regarding the color characteristic of an image is recorded.

The present invention also provides a computer readable recording medium on which the method for generating user preference data regarding the color characteristic of an image and the method for converting image color preference using user preference data regarding the color characteristic of an image are recorded as an executable program code.

According to an aspect of the present invention, there is provided a method for generating user preference data regarding a color characteristic of an image, the method comprising (a) when an image converted to have a color characteristic that a user prefers with respect to a predetermined image is referred to as a preference image and the predetermined image is referred to as a reference image, obtaining an image color characteristic value of the preference image and the reference image, (b) when a color characteristic value of the preference image is referred to as a preference value and a color characteristic value of the reference image is referred to as a reference value, generating {preference value, reference value} which corresponds to a pair of the preference value and the reference value, and (c) generating the pair {preference value, reference value} as preference meta-data having at least one feature block, and the feature block comprises a block header including a feature identifier corresponding to information identifying a color characteristic, and at least one feature descriptor including the preference value and the reference value. The color characteristic may be at least one of color temperature, brightness, contrast, and saturation. The method, before step (a), may further comprise providing a plurality of images having different color characteristic values with respect to a predetermined image, and setting an image that the user has selected from the plurality of images as a preference image, setting an original image with respect to the preference image as a reference image, and generating {preference image, reference image} which corresponds to a pair of the preference image and the reference image. The method, before step (a), may further comprise installing a unit for controlling a color characteristic of an image in an image display device, and setting an image of which color characteristic is adjusted by a user using the unit for controlling a color characteristic, as a preference image, setting an original image of which color characteristic is not adjusted by the user, as a reference image, and generating {preference image, reference image} which corresponds to a pair of the preference image and the reference image. The generating {preference image, reference image} may be, when the reference image has a contents identifier, generating {preference image, reference image, contents identifier} which corresponds to a combination of the preference image, the reference image, and contents identifier information. Step (b) may be, when the reference image has a contents identifier and when a color characteristic value of the preference image is referred to as a preference value and a color characteristic value of the reference image is referred to as a reference value, generating {preference value, reference value, contents identifier} which corresponds to a combination of the preference value, the reference value, and the contents identifier. A color temperature value in step (a) may be obtained by the following steps comprising extracting a highlight region from an input color image, projecting the highlight region on a chromaticity coordinate and calculating geometric representation variables with respect to a shape distributed on the chromaticity coordinate, estimating a color temperature from the input color image by perceptive light source estimation, and selecting geometric representation variables around the estimated color temperature from the geometric representation variables and calculating a final color temperature using the selected geometric representation variables. A saturation value in step (a) may be obtained by the following steps comprising obtaining saturation of each pixel in a HSV color space from an RGB value of a pixel in the image, and generating a value obtained by adding saturation of the pixels and dividing the added saturation by the number of pixels, as a saturation value. The saturation of the pixel may be determined by the following steps comprising obtaining maximum and minimum values of the RGB value of the pixel, and when the maximum value is equal to 0, setting the saturation of a corresponding pixel to 0, and when the maximum value is not equal to 0, setting a value obtained by dividing a difference between the maximum value and the minimum value by the maximum value, as the saturation of a corresponding pixel. A brightness value in step (a) may be determined by the following steps comprising obtaining luminance Y of each pixel in a YCbCr color space from an RGB value of a pixel in the image, and generating a value obtained by adding luminance of the pixels and dividing the added luminance by the number of pixels, as a brightness value. The luminance Y of the pixel may be determined by $Y=0.299 \times R+0.587 \times G+0.114 \times B$. A contrast value CV in step (a) may be, when $Y_x$ is luminance of each pixel in the image and NumberofPixels is the number of pixels in the image, determined using equation 3:

$$CV = \sqrt{\left[\sum_{x \in (pixels)} (Y_x - BV)^2\right] / NumberOfPixels}.$$

Step (b) may further comprise, when {preference value, reference value} exists before {preference value, reference value} in step (b) is generated, comparing the pair {preference value, reference value} generated in step (b) with an existing pair {preference value, reference value} and updating the pair {preference value, reference value}, and the updating is, with respect to one preference value, when the reference value generated in step (b) is compared with the existing reference value and is the same as or similar to the existing reference value, removing the existing reference value. The updating may be, when quantization levels of the two reference values are different, converting a value of high level into a value of low level and comparing with each other, and when image contents identifiers are added to the characteristic value pairs, even though the two reference values are the same as or similar to each other, if the image contents identifiers are different, without removing the existing reference value.

The number of the feature blocks may be four, and each of the feature blocks may correspond to the four characteristic values. The block header of the feature block may represent color temperature if the value of the feature identifier is '0', brightness if the value thereof is '1', contrast if the value thereof is '2', and saturation if the value thereof is '3'. The block header of the feature block may further comprise a number-of-descriptors value indicating the number of feature descriptors contained in the feature block. The feature descriptor may further comprise a Bin number indicating a quantization level of the characteristic value, a contents ID flag indicating the presence of an image contents identifier, and a contents identifier if the image contents identifier exists.

According to another aspect of the present invention, there is provided an apparatus for generating user preference data regarding a color characteristic of an image, the apparatus comprising a color characteristic calculating unit, which, when an image converted to have a color characteristic that a user prefers with respect to a predetermined image is referred to as a preference image and the predetermined image is referred to as a reference image, obtains an image color characteristic value of the preference image and the reference image, and when a color characteristic value of the preference image is referred to as a preference value and a color characteristic value of the reference image is referred to as a reference value, generates {preference value, reference value} which corresponds to a pair of the preference value and the reference value, and a meta-data generating unit, which generates the pair {preference value, reference value} generated in the color characteristic calculating unit as preference meta-data having at least one feature block, and the feature block comprises a block header including a feature identifier corresponding to information identifying a color characteristic, and at least one feature descriptor including the preference value and the reference value.

The apparatus may further comprise a first sample image obtaining unit, which sets an image that the user has selected from a plurality of images having different color characteristic values with respect to a predetermined image, sets an original image with respect to the preference image as a reference image, generates {preference image, reference image} which corresponds to a pair of the preference image and the reference image, and outputs the pair to the color characteristic calculating unit.

The apparatus may further comprise a second sample image obtaining unit, which, when a unit for controlling a color characteristic of an image is installed in an image display device, sets an image of which color characteristic is adjusted by a user using the unit for controlling a color characteristic, as a preference image, sets an original image of which color characteristic is not adjusted by the user, as a reference image, generates {preference image, reference image} which corresponds to a pair of the preference image and the reference image, and outputs the pair to the color characteristic calculating unit. The generating {preference image, reference image} may be, when the reference image has a contents identifier, generating {preference image, reference image, contents identifier} which corresponds to a combination of the preference image, the reference image, and contents identifier information.

The color characteristic calculating unit, when the reference image has a contents identifier, may further comprise a contents identifier in the pair {preference value, reference value} and may generate a combination {preference value, reference value, contents identifier}. The color characteristic calculating unit comprises a color temperature value calculating portion, which obtains a color temperature value, and the color temperature value calculating portion comprises a highlight detecting part, which extracts a highlight region from an input color image, a highlight variable calculating part, which projects the highlight region on a chromaticity coordinate and calculates geometric representation variables with respect to a shape distributed on the chromaticity coordinate, a color temperature estimating part, which estimates a color temperature from the input color image by perceptive light source estimation, and a color temperature calculating part, which selects geometric representation variables around the estimated color temperature from the geometric representation variables and calculates a final color temperature using the selected geometric representation variables. The color characteristic calculating unit comprises a saturation value calculating portion, which obtains saturation of each pixel in a HSV color space from an RGB value of a pixel in the image and generates a value obtained by adding saturation of the pixels and dividing the added saturation by the number of pixels, as a saturation value, and the saturation of the pixel is determined by the following steps comprising obtaining maximum and minimum values of the RGB value of the pixel, and when the maximum value is equal to 0, setting the saturation of a corresponding pixel to 0, and when the maximum value is not equal to 0, setting a value obtained by dividing a difference between the maximum value and the minimum value by the maximum value, as the saturation of a corresponding pixel. The color characteristic calculating unit comprises a brightness value calculating portion, which obtains luminance Y of each pixel in a YCbCr color space from an RGB value of a pixel in the image and generates a value obtained by adding luminance of the pixels and dividing the added luminance by the number of pixels, as a brightness value, and the luminance Y of the pixel is determined by $Y = 0.299 \times R + 0.587 \times G + 0.114 \times B$. The color characteristic calculating unit comprises a contrast value calculating portion, which, when $Y_x$ is luminance of each pixel in the image and NumberofPixels is the number of pixels in the image, calculates a contrast value determined using equation 3:

$$CV = \sqrt{\left[\sum_{x \in (pixels)} (Y_x - BV)^2\right] / NumberOfPixels}.$$

The apparatus may further comprise a meta-data updating unit, which compares the pair {preference value, reference value} generated in the color characteristic calculating unit with an existing pair {preference value, reference value}, updates the pair {preference value, reference value}, and outputs the pair to the meta-data generating unit, and the updating may be, with respect to one preference value, when the reference value generated in step (b) is compared with the existing reference value and is the same as or similar to the existing reference value, removing the existing reference value, and the updating is, when quantization levels of the two reference values are different, converting a value of high level into a value of low level and comparing with each other, and when image contents identifiers are added to the characteristic value pairs, even though the two reference values are the same as or similar to each other, if the image contents identifiers are different, without removing the existing reference value.

The block header of the feature block may further comprise the number of descriptor indicating the number of feature descriptors contained in the feature block. The feature descriptor may further comprise a Bin number indicating a quantization level of the characteristic value, a contents ID flag indicating the presence of an image contents identifier, and a contents identifier if the image contents identifier exists.

According to another aspect of the present invention, there is provided an apparatus for converting image color preference, the apparatus comprising an input image color characteristic calculating unit, which calculates a color characteristic value with respect to an input image, a color preference data unit, which generates preference meta-data having at least one feature block, the feature block comprising a block header including a feature identifier corresponding to information identifying a color characteristic and at least one feature descriptor including the preference value and the reference value, an image color characteristic mapping unit, which determines a target color characteristic value with respect to the input image using the color characteristic value of the input image calculated by the input image color characteristic calculating unit and the color preference data output from the color preference data unit, and an image color characteristic converting unit, which converts the color characteristic of the input image so that the input image has a color characteristic value obtained from the image color characteristic mapping unit. The block header of the feature block of the color preference data unit may further comprise a number-of-descriptors value indicating the number of feature descriptors contained in the feature block, and the feature descriptor of the color preference data unit may further comprise a Bin number indicating a quantization level of the characteristic value, a contents ID flag indicating the presence of an image contents identifier, and a contents identifier if the image contents identifier exists.

When a contents identifier of the input image exists, the image color characteristic mapping unit may determine a target color characteristic value with respect to the input image using the color characteristic value of the input image calculated by the input image color characteristic calculating unit and a color characteristic value of same contents identifier stored in the color preference data unit. The image color characteristic converting unit may comprise a color temperature converting portion, which converts the input image so that the input image has a color temperature value generated in the image color characteristic mapping unit, a brightness converting portion, which converts the input image so that the input image has a brightness value generated in the image color characteristic mapping unit, a contrast converting portion, which converts the input image so that the input image has a contrast value generated inn the image color characteristic mapping unit, and a saturation converting portion, which converts the input image so that the input image has a saturation value generated in the image color characteristic mapping unit.

According to another aspect of the present invention, there is provided a method for converting image color preference, the method comprising (a) calculating a color characteristic value with respect to an input image, (b) generating preference meta-data having at least one feature block, the feature block comprising a block header including a feature identifier corresponding to information identifying a color characteristic and at least one feature descriptor including the preference value and the reference value, (c) determining a target color characteristic value with respect to the input image using the color characteristic value of the input image calculated in step (a) and the color preference data output in step (b), and (d) converting the color characteristic of the input image so that the input image has the color characteristic value obtained in step (c). The block header of the feature block of the color preference data unit may further comprise a number-of-descriptors value indicating the number of feature descriptors contained in the feature block, and the feature descriptor in step (b) may further comprise a Bin number indicating a quantization level of the characteristic value, a contents ID flag indicating the presence of an image contents identifier, and a contents identifier if the image contents identifier exists. In step (c), when a contents identifier of the input image exists, a color characteristic value with respect to the input image may be obtained using the color characteristic value of the input image calculated in step (a) and a color characteristic value of same contents identifier output in step (b).

According to another aspect of the present invention, there is provided an image preference data recording medium on which, when an image converted to have a color characteristic that a user prefers with respect to a predetermined image is referred to as a preference image, the predetermined image is referred to as a reference image, a color characteristic value of the preference image is referred to as a preference value, and a color characteristic value of the reference image is referred to as a reference value, preference meta-data having at least one feature block, the feature block comprising a block header including a feature identifier corresponding to information identifying a color characteristic and at least one feature descriptor including the preference value and the reference value is recorded. The block header of the feature block may further comprise a number-of-descriptors value indicating the number of feature descriptors contained in the feature block, and the feature descriptor may further comprise a Bin number indicating a quantization level of the characteristic value, a contents ID flag indicating the presence of an image contents identifier, and a contents identifier if the image contents identifier exists.

There is provided a computer readable recording medium on which the invention is recorded as an executable program code.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, a method and apparatus for generating user preference data regarding the color characteristic of an image and a method and apparatus for converting image color preference using user preference data regarding the color characteristic of an image according to the present invention will be described in detail with reference to the accompanying drawings.

First, a method and apparatus for generating user preference data regarding the color characteristic of an image according to the present invention will be described as below.

Figure 1:
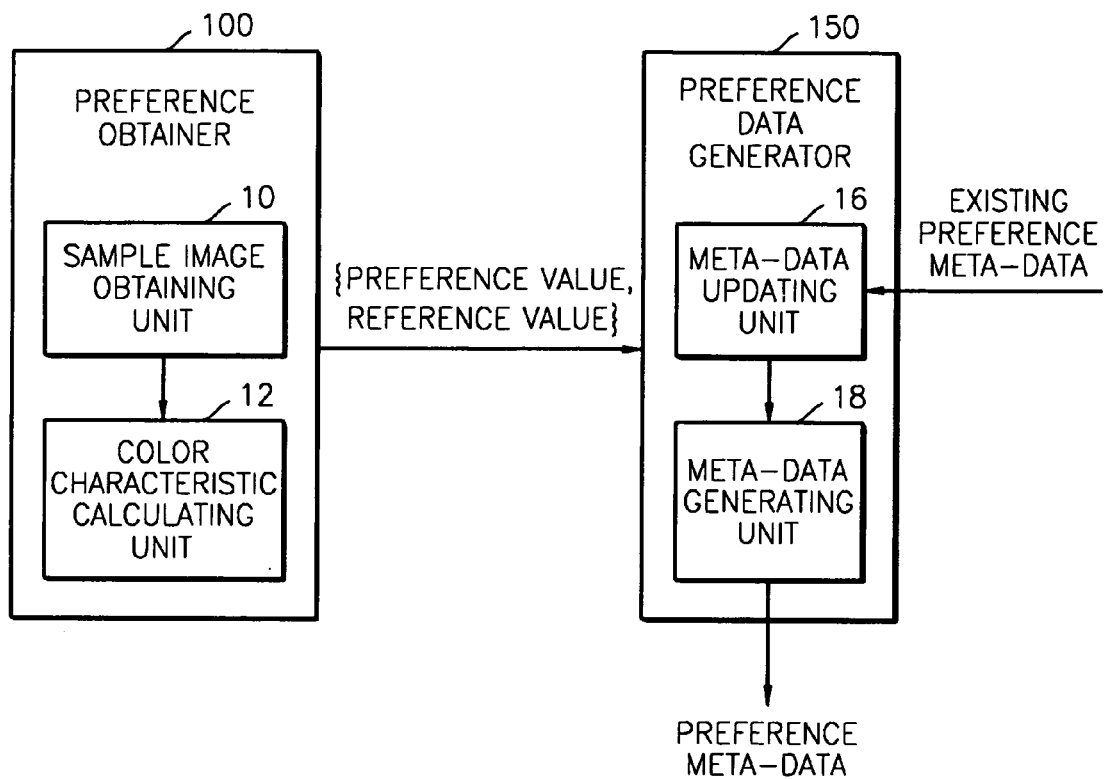
FIG. 1 is a block diagram illustrating a structure of an apparatus for generating user preference data regarding the color characteristic of an image according to the present invention.
Figure 6:
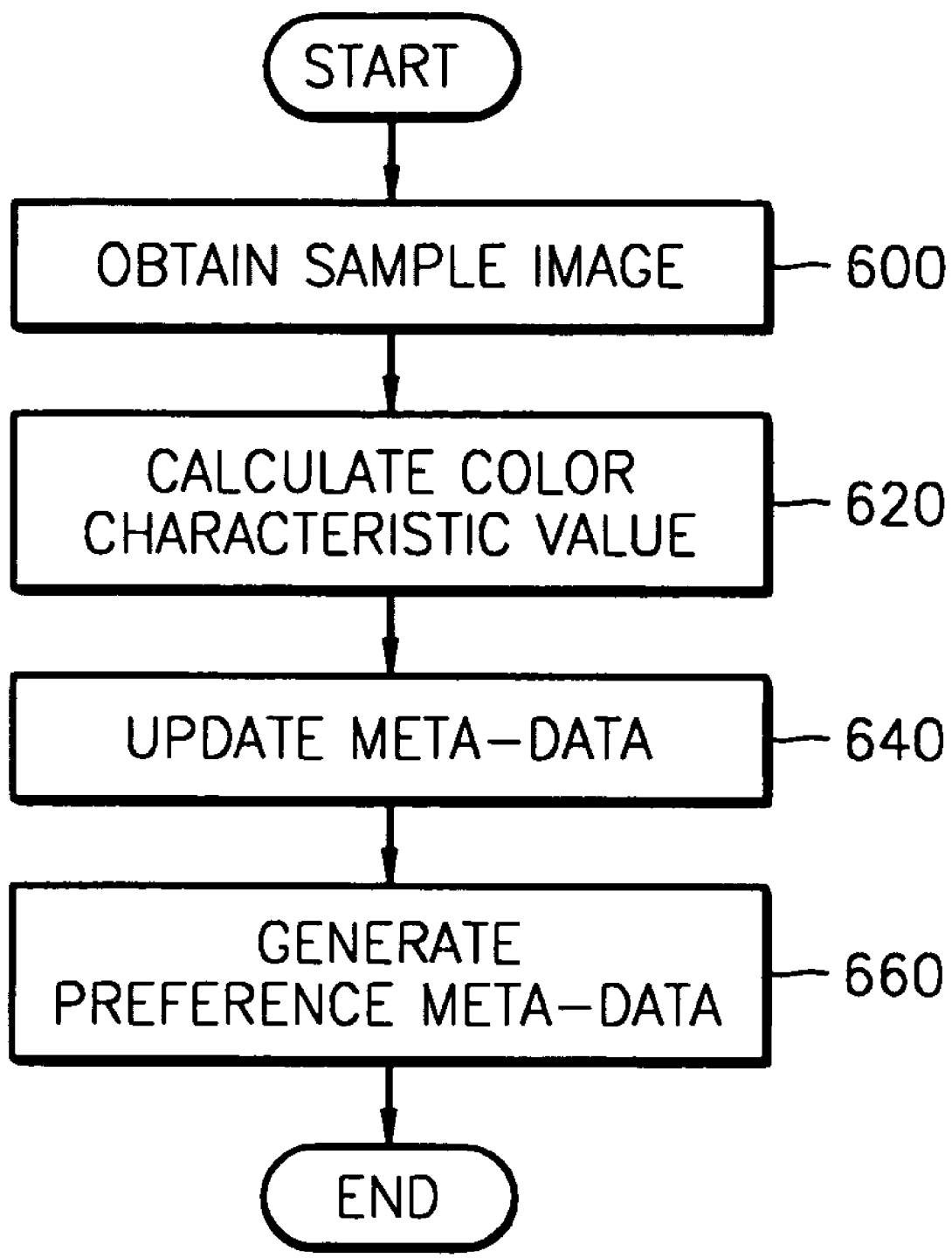
FIG. 6 is a flowchart illustrating a method for generating user preference data regarding the color characteristic of an image according to the present invention.

FIG. 1 is a block diagram illustrating a structure of an apparatus for generating user preference data regarding the color characteristic of an image according to the present invention. The apparatus for generating user preference data regarding the color characteristic of an image according to the present invention includes a preference obtainer 100 and a preference data generator 150. FIG. 6 is a flowchart illustrating a method for generating user preference data regarding the color characteristic of an image according to the present invention. The method for generating user preference data regarding the color characteristic of an image according to the present invention comprises obtaining a sample image (step 600), calculating a color characteristic value (step 620), updating meta-data (step 640), and generating preference meta-data (step 660).

First, terms used in the present invention will be described. An image converted to have a color characteristic that a user prefers with respect to a predetermined image is referred to as a preference image, and the predetermined image is referred to as a reference image. In addition, a color characteristic value of the preference image is referred to as a preference value, and a color characteristic value of the reference image is referred to as a reference value.

Preferably, a color characteristic considered in the present invention includes at least one of color temperature, brightness, contrast, and saturation. All of the color temperature, the brightness, the contrast, and the saturation are applied to a general case to which the present invention is applied. In addition, the color characteristic considered in the present invention is not limited to the four color characteristics, but other color characteristics may be considered in the present invention.

The preference obtainer 100 obtains a preference image and a reference image from a predetermined image, generates a preference value and a reference value from the obtained preference image and the reference image, respectively, and includes a sample image obtaining unit 10 and a color characteristic calculating unit 12.

Figure 2:
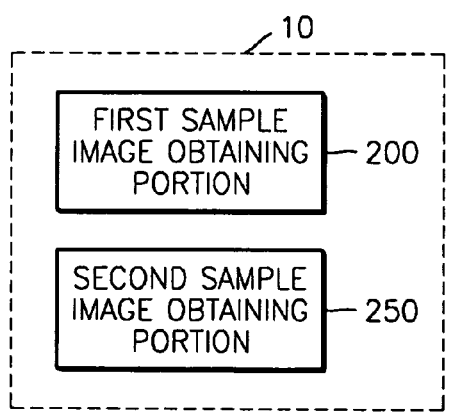
FIG. 2 is a block diagram illustrating a structure of a sample image obtaining unit.

FIG. 2 is a block diagram illustrating a structure of the sample image obtaining unit 10. The sample image obtaining unit 10 generates a pair of a preference image and a reference image, from a user's selection or a user's color adjustment (step 600). There are two methods for generating the pair of the preference image and the reference image. The methods correspond to a first sample image obtaining portion 200 and a second sample image obtaining portion 250 shown in FIG. 2, respectively. Thus, the present embodiment, the sample image obtaining unit 10 includes at least one of the first sample image obtaining portion 200 and the second sample image obtaining portion 250.

The first sample image obtaining portion 200 sets an image that the user has selected from a plurality of images having different color characteristic values with respect to a predetermined image as a preference image, sets an original image with respect to the preference image as a reference image, generates {preference image, reference image} which corresponds to a pair of the preference image and the reference image, and outputs the pair to the color characteristic calculating unit 12. In other words, the first sample image obtaining portion 200 constitutes a set of images converted to have different characteristic values from an original image with respect to each of four characteristics, such as color temperature, brightness, contrast, and saturation. Then, the first sample image obtaining portion 200 sets an image that the user has preferred, as a preference image, sets the original images as a reference image, and sets a pair {preference image, reference image}.

When a unit (not shown) for controlling a color characteristic of an image is installed in an image display device, the second sample image obtaining part 250 sets an image of which color characteristic is adjusted by the user using the unit for controlling a color characteristic, as a preference image, sets an original image of which color characteristic is not adjusted by the user, as a reference image, generates {preference image, reference image} which corresponds to a pair of the preference image and the reference image, and outputs the pair to the color characteristic calculating unit 12. In other words, when the unit for controlling a color characteristic of an image is installed in the image display device, the user adjusts a color characteristic using the unit when viewing video. In this case, the image before the user adjusts is referred to as a reference image, and the image obtained after the user has adjusted is referred to as a preference image.

When image contents including the reference image obtained by the first sample image obtaining portion 200 and the second sample image obtaining portion 250 have a contents identifier set by MPEG-21, TV anytime, or contents service provider, the sample image obtaining unit 10 can output an image contents identifier as well as the pair {preference image, reference image}.

The color characteristic calculating unit 12 calculates color characteristic values of the preference image and the reference image, generates a pair {preference value, reference value} which corresponds to a pair of a preference value and a reference value, and includes at least one of a color temperature value calculating portion 300, a saturation value calculating portion 320, a brightness value calculating portion 340, and a contrast value calculating portion 360.

More specifically, the color characteristic calculating unit 12 calculates all or a part of a color temperature value, a brightness value, a contrast value, and a saturation value with respect to an input pair {preference image, reference image} and outputs a pair {preference value, reference value} (step 620). When the color temperature calculating unit 12 receives an image contents identifier together with the pair {preference image, reference image}, the color temperature calculating unit 12 outputs the image contents identifier together with the pair {preference value, reference value}. The color characteristic calculating unit 12 calculates each color characteristic of an input image by the following method.

Figure 4:
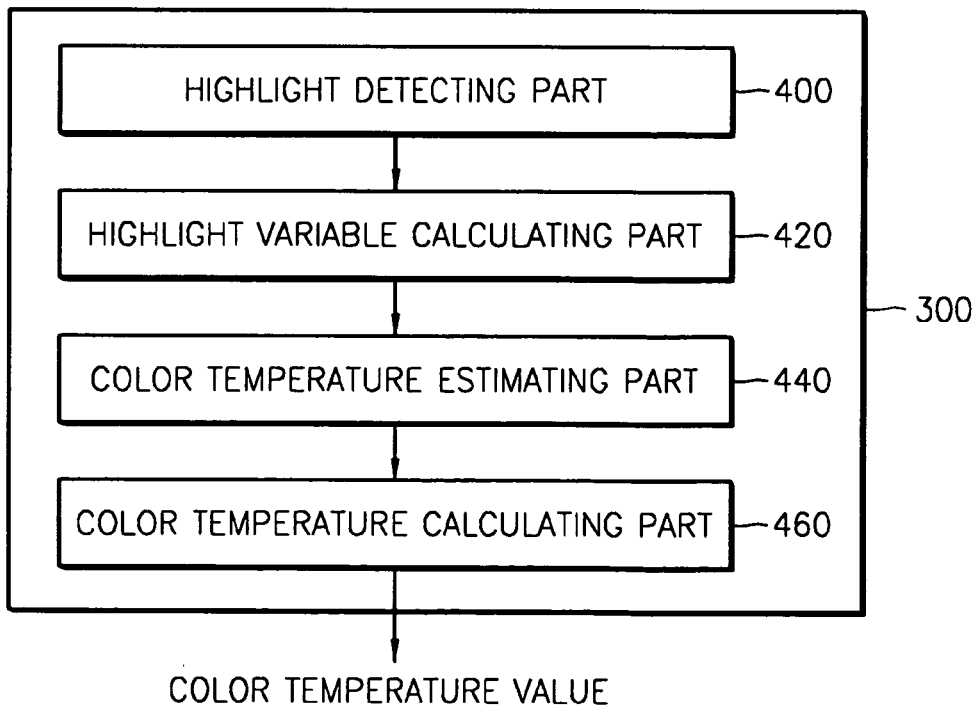
FIG. 4 is a block diagram illustrating a structure of a color temperature value calculating portion.

FIG. 4 is a block diagram illustrating a structure of the color temperature value calculating portion 300. The color temperature value calculating portion 300 calculates a color temperature value from an input color image and includes a highlight detecting part 400, a highlight variable calculating part 420, a color temperature estimating part 440, and a color temperature calculating part 460. The highlight detecting part 400 extracts highlight regions from the input color image. The highlight variable calculating part 420 projects the highlight regions on a chromaticity coordinate and calculates geometric representation variables with respect to a shape distributed on the chromaticity coordinate. The color temperature estimating part 440 estimates a color temperature from the input color image by perceptive light source estimation. The color temperature calculating part 460 selects geometric representation variables around the estimated color temperature from the geometric representation variables and calculates a final color temperature using the selected geometric representation variables. The color temperature value may be expressed as 8-bit data, as specified in a color temperature descriptor ISO/IEC 15938-3.

The saturation value calculating portion 320 obtains saturation corresponding to S in a HSV color space of each pixel from an RGB value of a pixel in an image to be displayed and generates a value obtained by adding saturation of the pixels and dividing the added saturation by the number of pixels, as a saturation value. When maximum and minimum values of the RGB value of the pixel are obtained and the maximum value is equal to 0, the saturation of a corresponding pixel is set to 0, and when the maximum value is not equal to 0, a value obtained by dividing a difference between the maximum value and the minimum value by the maximum value, is set as the saturation of a corresponding pixel.

This will be expressed using the following equation. Saturation S in the HSV color space is obtained from (R,G,B) values of each pixel in an input image as below.

Max=max(R, G, B),
Min=min(R, G, B)
if(Max==0) S=0 else S=(Max−Min)/Max
A saturation value SV is calculated using equation 1.

$$SV = \left[ \sum_{x \in (pixels)} S_x \right] / NumberOfPixels \quad (1)$$

Here, $S_x$ is an S-value of each pixel in an image to be displayed.

The brightness value calculating portion 340 obtains luminance Y corresponding to Y in a YCbCr color space of each pixel from an RGB value of a pixel in an image to be displayed and generates a value obtained by adding luminance of the pixels and dividing the added luminance by the number of pixels, as a brightness value. The luminance Y of the pixel is determined by Y=0.299×R+0.587×G+0.114×B.

A brightness value BV is calculated using equation 2.

$$BV = \left[ \sum_{x \in (pixels)} Y_x \right] / NumberOfPixels \quad (2)$$

Here, $Y_x$ is a Y-value of each pixel in an image to be displayed.

When $Y_x$ is luminance of each pixel in the image, NumberofPixels is the number of pixels in the image and a contrast value is CV, the contrast value calculating portion 360 calculates the contrast value CV using equation 3.

$$CV = \sqrt{\left[ \sum_{x \in (pixels)} (Y_x - BV)^2 \right] / NumberOfPixels} \quad (3)$$

The preference obtainer 100 may include only the color characteristic calculating unit 12 without the sample image obtaining unit 10 when a preference image and a reference image are previously prepared.

Meanwhile, the preference data generator 150 receives the preference value and the reference value generated in the preference obtainer 100, generates preference meta-data having at least one feature block, and includes a meta-data updating unit 16 and a meta-data generating unit 18.

The meta-data updating unit 16 compares the pair {preference value, reference value} generated in the color characteristic calculating unit 12 with an existing pair {preference value, reference value}, updates and outputs the pair {preference value, reference value} to the meta-data generating unit 18 (step 640).

The meta-data updating unit 16 operates when preference meta-data already exists. The meta-data updating unit 16 receives a pair or a plurality of pairs {preference value, reference value} from the preference obtainer 100. In addition, the meta-data updating unit 16 receives characteristic value pairs in existing preference meta-data, removes redundancy and contradiction of the preference data, and then, outputs updated pairs {preference value, reference value}. The meta-data updating unit 16 operates with respect to each preference as below.

When with respect to one preference, a newly-input characteristic value pair is A and an existing characteristic value pair is B, a reference value of A is compared with a reference value of B. When the reference value of A is the same as or similar to the reference value of B, B is removed. Here, a similar case means a case where a difference between the reference value of A and the reference value of B is within a predetermined range. In addition, when quantization levels of the two reference values are different, a value of high level is converted into a value of low level and is compared with each other.

When image contents identifiers are added to the characteristic value pairs, even though the reference value of A is the same as or similar to the reference value of B, if the image contents identifiers are different, B is not removed. The existing characteristic value pairs and the new characteristic value pairs, which are not removed in the above procedure, are output.

The meta-data generating unit 18 receives the pair {preference value, reference value} from the meta-data updating unit 16 or the color characteristic calculating unit 12 and generates preference meta-data having at least one feature block (step 660). The feature block includes a block header including a feature identifier corresponding to information identifying a color characteristic and at least one feature descriptor including the preference value and the reference value.

Figure 5:
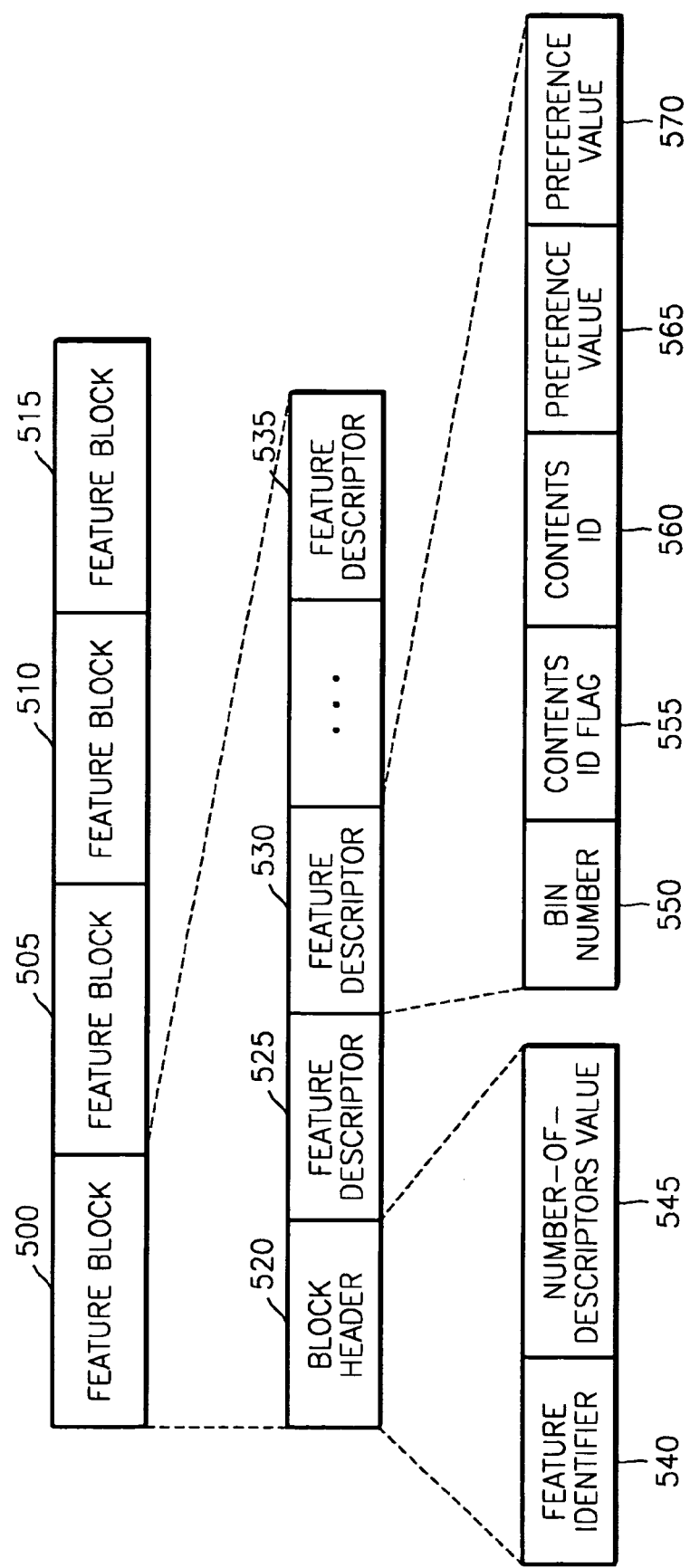
FIG. 5 illustrates a structure of preference meta-data according to the present invention.

The preference meta-data will be described in more detail as below. When a contents identifier is input, identifier information is added to meta-data, as shown in FIG. 5.

The preference meta-data is composed of four feature blocks 500, 505, 510, and 515. Each of the four feature blocks 500, 505, 510, and 515 has information corresponding to each of four preferences, such as color temperature, saturation, brightness, and contrast.

Each feature block includes one block header 520 and a plurality of feature descriptors 525, 530, ..., and 535 or one thereof. The block header 520 includes a feature identifier 540 indicating that a color characteristic to be represented, and a number-of-descriptors value 545 indicating how many feature descriptors exist in a corresponding block. If the above data structure is represented in a binary sequence, the feature identifier 540 may be represented with a 2-bit flag. In this case, if the value of the feature identifier 540 is '0', the feature identifier 540 may be represented with color temperature. If the value thereof is '1', the feature identifier 540 may be represented with brightness. If the value thereof is '2', the feature identifier 540 may be represented with contrast, and if the value thereof is '3', the feature identifier 540 may be represented with saturation. In addition, the number-of-descriptors value 545 may be represented with a variable flag indicating that, for example, 3 bits of 4 bits mean the number of bits and if last 1 bit is 1, 4 bits continue.

If the above data structure is represented with XML, the feature identifier 540 is represented with a string, and the number-of-descriptors value 545 is not represented.

The feature descriptor 530 includes a Bin number 550 indicating a quantization level of the characteristic value, a contents ID flag 555 indicating the presence of an image contents identifier, a contents identifier 560, a preference value 565, and a reference value 570.

The Bin number indicates the quantization level of characteristic value representation. The quantization level of the characteristic value is within a range of 8 bits with respect to color temperature and is within a range of 12 bits with respect to other characteristic values.

If the data structure is represented with XML, the contents ID flag is not represented. The above-described color preference data may be represented/recorded as xml-data according to xml-schema definition.

A data format generated in the meta-data generating unit may be represented as xml-data according to xml-schema definition.

1. DisplayPresentationPreferences

DisplayPresentationPreferences specifies the preferences of a user regarding the display of images and video.

1.1 DisplayPresentationPreferences Syntax

```
<!-- ################################################# -->
<!--   Definition of DisplayPresentationPreferences  -->
<!-- ################################################# -->

<complexType name="DisplayPresentationPreferencesType">
    <complexContent>
        <extension base="dia:DIABaseType">
            <sequence>
                <element name="ColorTemperaturePreference"
                    type="dia:ColorPreferenceType"
                    minOccurs="0"/>
                    <element name = "BrightnessPreference"
                        type = "dia:ColorPreferenceType"
                    minOccurs="0"/>
                <element name="SaturationPreference"
                        type="dia:ColorPreferenceType"
                    minOccurs="0"/>
                <element name="ContrastPreference"
                        type = "dia:ColorPreferenceType"
                    minOccurs="0"/>
            </sequence>
        </extension>
    </complexContent>
</complexType>
```

1.2 DisplayPresentationPreferences Semantics

DisplayPresentationPreferences Type is a tool that describes the display presentation preferences of a user.

ColorTemperaturePreference describes the color temperature that a User prefers. The color temperature is defined as the correlated color temperature of estimated illumination of the image to be displayed.

BrightnessPreference describes the brightness that a user prefers. The brightness is defined as an attribute of a visual sensation according to which an area appears to emit more or less light.

SaturationPreference describes the saturation that a user prefers. The saturation is defined as the colorfulness of an area judged in proportion to its brightness.

ContrastPreference describes the contrast that a user prefers. The contrast is defined to be the ratio of luminance between the lightest and darkest elements of a scene.

StereoscopicVideoConversion describes the preferred parameters of a user for stereoscopic video conversion.

2. ColorPreference

ColorPreference specifies color preference. In DisplayPresentationPreference, to express a user's preference regarding the color of displayed image and video, four attributes of color are considered; color temperature, brightness, saturation and contrast. The ColorPreference Type is a tool to describe preferences related to such attributes of color.

2.1 ColorPreference Syntax

```
<!-- ################################################# -->
<!-- Definition of ColorPreference -->
<!-- ################################################# -->
<complexType name="ColorPreferenceType">
    <complexContent>
        <extension base="dia:DIABaseType">
            <sequence>
                <element name="BinNumber" type="mpeg7:
                    unsigned12"/>
                <element name="Value" minOccurs="0"
                maxOccurs="unbounded">
                    <complexType>
                        <sequence>
                            <element name = "PreferredValue"
```

```
                type="mpeg7:unsigned12"/>
                <element name = "ReferenceValue"
type="mpeg7:unsigned12"/>
              </sequence>
            </complexType>
          </element>
        </sequence>
      </extension>
    </complexContent>
</complexType>
```

2.2 ColorPreference Sematics

ColorPreference Type is a tool that describes the color preferences of a user when viewing visual images. The color preference can be described in terms of color temperature, brightness, saturation and contrast.

BinNumber describes the quantization level that PreferredValue and ReferenceValue take.

Value Indicates the minimal unit that describes the color preference of a user. It includes two subelements: PreferredValue and ReferenceValue. If PreferredValue is equal to v1, and ReferenceValue is equal to v2, it indicates that the user wants to convert an image of value v2 into an image of value v1 with respect to an attribute of color that ColorPreferenceType descriptor specifies.

PreferredValue describes the value of a color attribute that a user prefers.

ReferenceValue describes the value of a color attribute in an image that is used as reference to express the PreferredValue. If ReferenceValue is equal to zero, it means that ReferenceValue is not considered.

Table 1 gives the value definition of PreferredValue and ReferenceValue for four attributes of color: color temperature, brightness, saturation and contrast of images and videos to be displayed.

TABLE 1

| Attribute Name | Value Type | Value Definition | Value Range, Number of Bins, Quantization Type |
|---|---|---|---|
| Color Temperature | Color Temperature is specified in ISO/IEC 15938-3 | Correlated color temperature of estimated illumination of the image to be displayed | The range [1667, 25000] is quantized into $2^8$ bins in a non-uniform way as specified in ISO/IEC 15938-3 |
| Brightness | Y-value in the YCbCr* color space | Mean value of Y-values of all pixels in the image to be displayed | The range [0, 1] is uniformly quantized. Number of bins $\leq 2^{12}$. |
| Saturation | S-value in the HSV* color space | Mean value of S-values of all pixels in the image to be displayed | The range [0, 1] is uniformly quantized. Number of bins $\leq 2^{12}$. |
| Contrast | Y-value in the YCbCr* color space | Standard deviation of Y-values of all pixels in the image to be displayed | The range [0, 1] is uniformly quantized. Number of bins $\leq 2^{12}$. |

In Table 1, the color spaces YCbCr and HSV are specified in ISO/IEC 15938-3. The standard expressions of Y value and S value are also specified there.

2.3 ColorPreference Examples

ColorPreference allows multiple occurrences of the pair, (PreferredValue,ReferenceValue) so that the pairs can be used to find an optimal mapping of color attributes, for example, through selection among available mapping functions or interpolation by using the pairs as poles. Based on the obtained mapping strategy, an application may convert images so that the resulting images satisfy the user preference for color. The following example shows the use of the DisplayPresentationPreferences description tool to express color preference of user.

```
<DIA>
    <Description xsi:type="UsageEnvironmentType">
        <UsageEnvironment xsi:type="UserCharacteristicsType">
            <UserCharacteristics xsi:type="PresentationPreferences
                Type">
            <Display>
                <ColorTemperaturePreference>
                    <BinNumber>255</BinNumber>
                    <Value>
                        <PreferredValue>110</PreferredValue>
                        <ReferenceValue>127</ReferenceValue>
                    </Value>
                    <Value>
                        <PreferredValue>156</PreferredValue>
                        <ReferenceValue>151</ReferenceValue>
                    </Value>
                    <Value>
                        <PreferredValue>200</PreferredValue>
                        <ReferenceValue>192</ReferenceValue>
                    </Value>
                </ColorTemperaturePreference>
                <BrightnessPreference>
                    <BinNumber>255</BinNumber>
                    <Value>
                        <PreferredValue>138</PreferredValue>
                        <ReferenceValue>103</ReferenceValue>
                    </Value>
                    <Value>
                        <PreferredValue>152</PreferredValue>
                        <ReferenceValue>150</ReferenceValue>
                    </Value>
                </BrightnessPreference>
                <SaturationPreference>
                    <BinNumber>255</BinNumber>
                    <Value>
                        <PreferredValue>94</PreferredValue>
                        <ReferenceValue>80</ReferenceValue>
                    </Value>
                </SaturationPreference>
                <ContrastPreference>
                    <BinNumber>255</BinNumber>
                    <Value>
                        <PreferredValue>80</PreferredValue>
                        <ReferenceValue>70</ReferenceValue>
                    </Value>
                </ContrastPreference>
            </Display>
        </UserCharacteristics>
    </UsageEnvironment>
    </Description>
</DIA>
```

Next, a method and apparatus for converting image color preference using user preference data regarding the color characteristic of an image according to the present invention will be described in detail.

Figure 7:
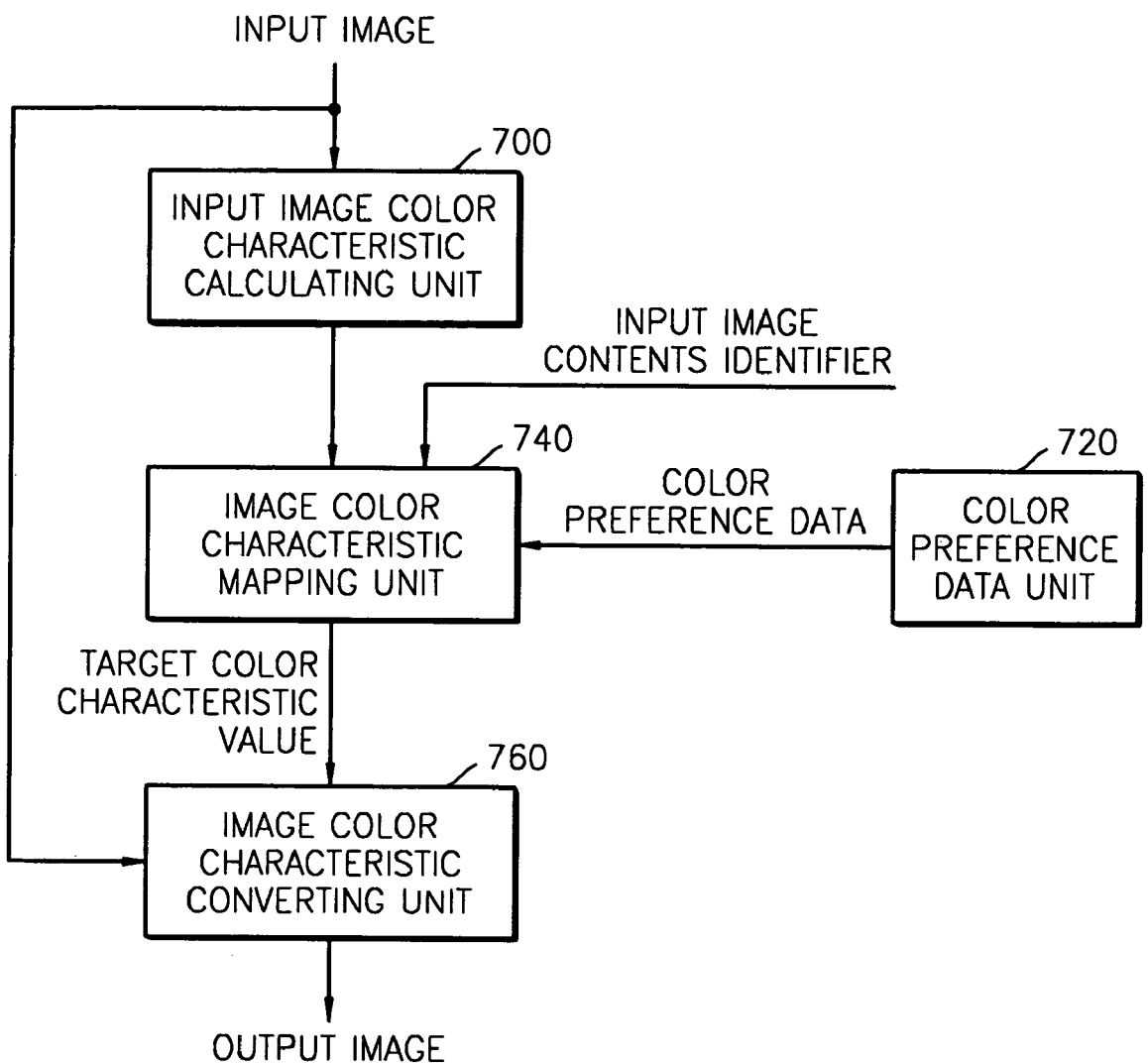
FIG. 7 is a block diagram illustrating a structure of an apparatus for converting image color preference using preference data regarding the color characteristic of an image according to the present invention.
Figure 9:
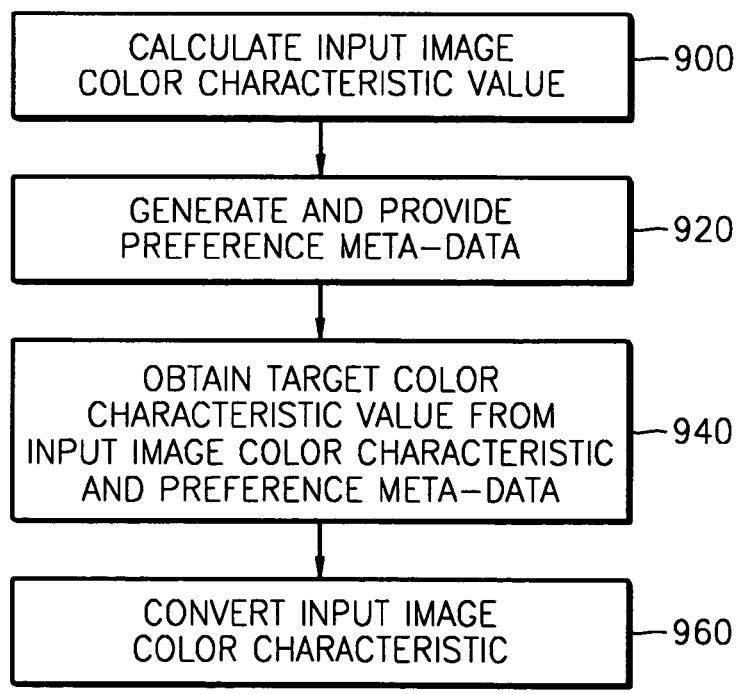
FIG. 9 is a flowchart illustrating a method for converting image color preference using user preference data regarding the color characteristic of an image according to the present invention.

FIG. 7 is a block diagram illustrating a structure of an apparatus for converting image color preference using preference data regarding the color characteristic of an image according to the present invention. The apparatus for converting image color preference includes an input image color characteristic calculating unit 700, a color preference data unit 720, an image color characteristic mapping unit 740, and an image color characteristic converting unit 760. FIG. 9 is a flowchart illustrating a method for converting image color preference using user preference data regarding the color characteristic of an image according to the present invention. The method for converting image color preference comprises calculating an input image color characteristic value (step 900), generating and providing user preference meta-data (step 920), generating a target color characteristic value from the input image color characteristic value and the user preference meta-data (step 940), and converting a color characteristic of an input image (step 960).

Figure 3:
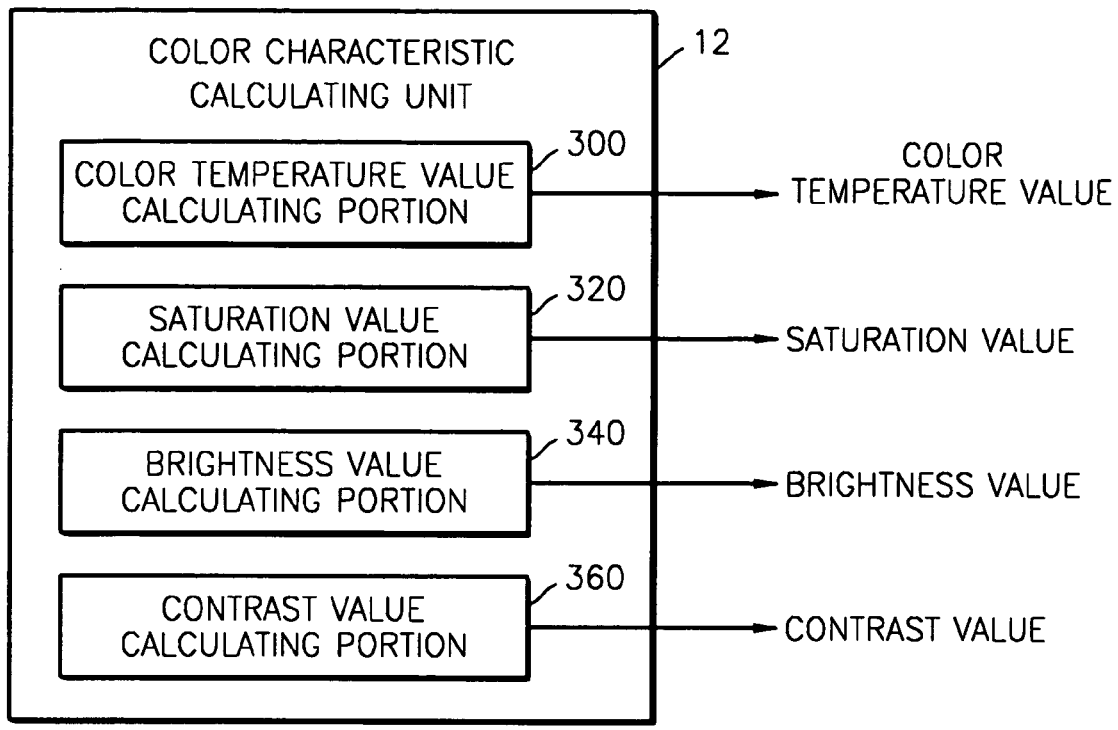
FIG. 3 is a block diagram illustrating a structure of a color characteristic calculating unit.

The input image color characteristic calculating unit 700 calculates a color characteristic value with respect to an input image (step 900). The input image color characteristic calculating unit 700 calculates at least one of four color characteristics, such as color temperature, saturation, brightness, and contrast, from the input image. The color characteristic value may be calculated by the color temperature value calculating portion 300, the saturation value calculating portion 320, the brightness value calculating portion 340, and the contrast value calculating portion 360 of the color characteristic calculating unit 12 shown in FIG. 3. The calculated color characteristic value is recorded in each frame of an image or in each image time period, and thus, an input image color characteristic is output.

The color preference data unit 720 generates preference meta-data having at least one feature block and provides the preference meta-data to the image color characteristic mapping unit 740 (step 920). The color preference data unit 720 is the same as the apparatus for generating user preference data regarding the color characteristic of an image of FIG. 1.

The image color characteristic mapping unit 740 determines a target color characteristic value with respect to the input image using the color characteristic value of the input image calculated by the input image color characteristic calculating unit 700 and the color preference data output from the color preference data unit 720 (step 940).

More specifically, input image color characteristic data is input into the image color characteristic mapping unit 740, and then, the image color characteristic mapping unit 740 receives color preference data having a reference value being equal to or approximating the input image color characteristic value from the color preference data unit 720. If a contents identifier is contained in an input image, the image color characteristic mapping unit 740 may receive color preference data composed of a combination {preference value, reference value, image contents identifier} having same contents identifier from the color preference data unit 720. As a result, the image color characteristic mapping unit 740 determines and outputs a target color characteristic value using the input image color characteristic value and the color preference data.

Figure 8:
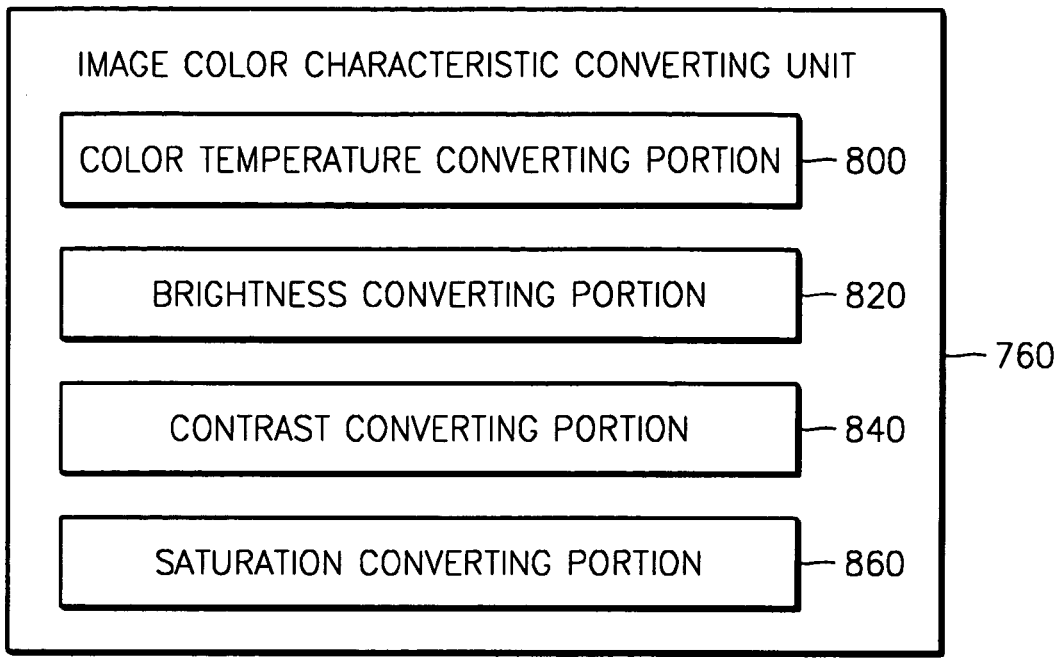
FIG. 8 is a block diagram illustrating a structure of an image color characteristic converting unit.

The image color characteristic converting unit 760 converts the color characteristic of the input image so that the input image has a target color characteristic value determined using the image color characteristic mapping unit 740 (step 960). FIG. 8 is a block diagram illustrating a structure of the image color characteristic converting unit 760. The image color characteristic converting unit 760 includes the a color temperature converting portion 800, a brightness converting portion 820, a contrast converting portion 840, and a saturation converting portion 860.

The color temperature converting portion 800 converts the input image so that the input image has a target color temperature value determined by the image color characteristic mapping unit 740. Color temperature conversion may be performed diversely. An example of color temperature conversion is as follows: an input color temperature of an input image is estimated. The estimated color temperature of the input image and a user preference color temperature are received. When a predetermined reference color temperature is converted into the user preference color temperature by a predetermined mapping method, a target color temperature of an output image in which the color temperature of the input image is converted by the mapping method is obtained. Then, a color temperature conversion coefficient is obtained using the input color temperature and the output color temperature, and the input image is converted into an output image having the target color temperature based on the color temperature conversion coefficient.

The brightness converting portion 820 converts the input image so that the input image has a brightness value generated in the image color characteristic mapping unit 740. Brightness conversion of an image may be performed diversely. An example of image brightness conversion is as follows: first, a brightness enhancement reference value of a predetermined pixel is obtained. A brightness enhancement ratio is obtained by dividing the brightness enhancement reference value by a maximum component value. Then, brightness is enhanced by multiplying each component of the predetermined pixel by the brightness enhancement ratio.

The contrast converting portion 840 converts the input image so that the input image has a contrast value generated inn the image color characteristic mapping unit 740. Contrast conversion of an image may be performed diversely. An example of image contrast conversion is as follows: first, average brightness in one frame of an image is obtained. A brightness enhancement parameter is calculated from the average brightness of the image. Maximum and minimum values of the brightness range of the image are calculated. An application brightness range maximum value/minimum value is calculated. Brightness range extension is calculated in each pixel and in each section. Brightness enhancement values are calculated in each pixel using the brightness enhancement parameter. Calculation of brightness range extension in each pixel and in each section and calculation of brightness enhancement values in each pixel using the brightness enhancement parameter are repeatedly performed until all pixels in one frame of the image are processed.

The saturation converting portion 860 converts the input image so that the input image has a saturation value generated in the image color characteristic mapping unit 740. Saturation conversion of an image may be performed diversely. An example of image saturation conversion is as follows: first, a saturation component is extracted from an input image. A saturation enhancement function used to enhance saturation of the input image is determined according to a predetermined reference value. Then, the extracted saturation component is changed using the saturation enhancement function, the changed saturation component and the remaining component of the input image are synthesized, thereby generating an output color value. An output image is generated based on the output color value.

The present invention can also be embodied on computer (including all devices having an information processing function) readable recording media. The computer readable recording media include all types of recording devices in which data that can be read by a computer system are stored, such as ROMs, RAMs, CD-ROMs, magnetic tapes, floppy discs, and optical data storage units.

As described above, in a method and apparatus for generating user preference data regarding the color characteristic of an image and a method and apparatus for converting image color preference using the method and apparatus, a target value that satisfies user's characteristics is set when a color characteristic of an image is converted, such that a converted image that satisfies user preference can be obtained.

In addition, since a color preference data structure generated according to the present invention can be represented with a data format, such as XML and binary sequence, the color preference data structure can be commonly used to generate video that satisfies user preference in an image display device having a variety of obtained color preferences, image display software, and a service system and apparatus for supplying video to a user via wire/wireless transmission.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for generating user preference data regarding a color characteristic of a reference image, wherein a preference image comprises the reference image converted to have a color characteristic that a user prefers, and a preference value comprises a color characteristic value of the preference image and a reference value comprises a color characteristic value of the reference image, the method comprising:
   (a) generating a characteristic value pair, wherein the characteristic value pair includes preference value data and reference value data, which corresponds to a pair of the preference value and the reference value; and
   (b) generating preference meta-data having at least one feature block for the characteristic value pair, wherein the feature block comprises:
   a block header including a feature identifier corresponding to information identifying a color characteristic and a Bin number indicating a quantization level of the characteristic value, the color characteristic being at least one of color temperature, brightness, contrast, and saturation, wherein when the color characteristic includes contrast, a contrast value is determined as a standard deviation of luminance values of all pixels in the image to be displayed; and
   at least one feature descriptor including the preference value and the reference value as values of the identified color characteristic for the preference image and the reference image, respectively,
   wherein said method is carried by a computer.

2. The method of claim 1, before step (a), further comprising:
   providing a plurality of images having different color characteristic values with respect to a predetermined image; and
   setting an image that the user has selected from the plurality of images as a preference image, setting an original image with respect to the preference image as a reference image, and generating preference image data and reference image data, which corresponds to a pair of the preference image and the reference image.

3. The method of claim 2, wherein the generating preference image data and reference image data includes, when the reference image has a contents identifier, generating preference image data, reference image data, and contents identifier data, wherein the contents identifier data, correspond to a combination of the preference image, the reference image, and contents identifier information.

4. The method of claim 1, before step (a), further comprising:
   installing a unit for controlling a color characteristic of an image in an image display device; and
   setting an image of which color characteristic is adjusted by a user using the unit for controlling a color characteristic, as a preference image, setting an original image of which color characteristic is not adjusted by the user, as a reference image, and generating preference image data and reference image data, which corresponds to a pair of the preference image and the reference image.

5. The method of claim 4, wherein the generating preference image data and reference image data includes, when the reference image has a contents identifier, generating preference image data, reference image data, and contents identifier data, wherein the contents identifier data, correspond to a combination of the preference image, the reference image, and contents identifier information.

6. The method of claim 1, wherein in step (a), when the reference image has a contents identifier and when a color characteristic value of the preference image is referred to as a preference value and a color characteristic value of the reference image is referred to as a reference value, generating preference value data, reference value data and contents identifier data, wherein the contents identifier data, correspond to a combination of the preference value, the reference value, and the contents identifier.

7. The method of claim 6, wherein step (b) further comprising,
   when preference value data and reference value data exists before preference value data and reference value data in step (b) is generated, comparing the preference value data and reference value data generated in step (b) with an existing preference value and reference value and updating the preference value data and reference value data,
   wherein the updating is, with respect to one preference value, when the reference value generated in step (b) is compared with the existing reference value and is the same as or similar to the existing reference value, removing the existing reference value.

8. The method of claim 1, wherein a color temperature value is obtained by the following steps comprising:
   extracting a highlight region from an input color image;
   projecting the highlight region on a chromaticity coordinate and calculating geometric representation variables with respect to a shape distributed on the chromaticity coordinate;
   estimating a color temperature from the input color image by perceptive light source estimation; and
   selecting geometric representation variables around the estimated color temperature from the geometric representation variables and calculating a final color temperature using the selected geometric representation variables.

9. The method of claim 1, wherein a saturation value is obtained by the following steps comprising:
   obtaining saturation of each pixel in a HSV color space from an RGB value of a pixel in the image; and
   generating a value obtained by adding saturation of the pixels and dividing the added saturation by the number of pixels, as a saturation value.

10. The method of claim 1, wherein a brightness value is determined by the following steps comprising:
    obtaining luminance Y of each pixel in a YCbCr color space from an RGB value of a pixel in the image; and
    generating a value obtained by adding luminance of the pixels and dividing the added luminance by the number of pixels, as a brightness value.

11. The method of claim 10, wherein the luminance Y of the pixel is determined by $Y=0.299 \times R+0.587 \times G+0.114 \times B$.

12. The method of claim 1, wherein step (a) further comprises,
    when preference value data and reference value data exists before preference value data and reference value data in step (a) is generated, comparing the preference value data and reference value data generated in step (a) with an existing pair preference value data and reference value data and updating the preference value data and reference value data, wherein the updating is, with respect to one preference value, when the reference value generated in step (a) is compared with the existing reference value and is the same as or similar to the existing reference value, removing the existing reference value.

13. The method of claim 12, wherein the updating is, when quantization levels of the two reference values are different, converting a value of high level into a value of low level and comparing with each other, and when image contents identifiers are added to the characteristic value pairs, even though the two reference values are the same as or similar to each other, if the image contents identifiers are different, without removing the existing reference value.

14. The method of claim 1, wherein the number of the feature blocks is four, and each of the feature blocks corresponds to the four characteristic values.

15. The method of claim 1, wherein the block header of the feature block represents color temperature if the value of the feature identifier is '0', brightness if the value thereof is '1', contrast if the value thereof is '2', and saturation if the value thereof is '3'.

16. The method of claim 1, wherein the block header of the feature block further comprises a number-of-descriptors value indicating the number of feature descriptors contained in the feature block.

17. The method of claim 1, wherein the feature descriptor further comprises:
a contents ID flag indicating the presence of an image contents identifier; and
a the contents identifier if the image contents identifier exists.

18. A method for generating user preference data regarding a color characteristic of an image, wherein a preference image comprises an image converted to have a color characteristic that a user prefers with respect to a predetermined reference image, a preference value comprises a color characteristic value of the preference image and a reference value comprises a color characteristic value of the reference image, the method comprising:

(a) generating a characteristic value pair preference value data and reference value data, which correspond to a pair of the preference value and the reference value; and (b) generating preference meta-data having at least one feature block for the characteristic value pair, wherein the feature block comprises:

a block header including a feature identifier corresponding to information identifying a color characteristic, the color characteristic being at least one of color temperature, brightness, contrast, and saturation, wherein the saturation value is obtained by the following steps comprising:

obtaining saturation of each pixel in a HSV color space from an RGB value of a pixel in the image, the saturation of the pixel being determined by the following steps comprising:

obtaining maximum and minimum values of the RGB value of the pixel, and when the maximum value is equal to 0, setting the saturation of a corresponding pixel to 0, and when the maximum value is not equal to 0, setting a value obtained by dividing a difference between the maximum value and the minimum value by the maximum value, as the saturation of a corresponding pixel, and generating a value obtained by adding saturation of the pixels and dividing the added saturation by the number of pixels, as a saturation value; and at least one feature descriptor including the preference value and the reference value as values of the identified color characteristic for the preference image and the reference image, respectively, wherein said method is carried by a computer.

19. A method for generating user preference data regarding a color characteristic of an image, wherein a preference image comprises an image converted to have a color characteristic that a user prefers with respect to a predetermined reference image, a preference value comprises a color characteristic value of the preference image and a reference value comprises a color characteristic value of the reference image, the method comprising:

(a) generating a characteristic value pair, wherein the characteristic value pair includes preference value data and reference value data, which correspond to a pair of the preference value and the reference value; and (b) generating preference meta-data having at least one feature block for the characteristic value pair, wherein the feature block comprises:

a block header including a feature identifier corresponding to information identifying a color characteristic, the color characteristic being at least one of color temperature, brightness, contrast, and saturation, wherein a contrast value CV is, when Yx is luminance of each pixel in the image and NumberofPixels is the number of pixels in the image, determined using the following equation:

$$CV = \sqrt{\left[\sum_{x \in (pixels)} (Y_x - BV)^2\right] / NumberOfPixels} \text{; and}$$

at least one feature descriptor including the preference value and the reference value as values of the identified color characteristic for the preference image and the reference image, respectively, wherein said method is carried by a computer.

20. An apparatus for generating user preference data regarding a color characteristic of a reference image, wherein a preference image comprises the reference image converted to have a color characteristic that a user prefers a preference value comprises a color characteristic value of the preference image and a reference value comprises a color characteristic value of the reference image, the apparatus comprising:

a color characteristic calculating unit, which obtains an image color characteristic value of the preference image and the reference image, and generates a characteristic value pair wherein the characteristic value pair includes preference value data and reference value data which corresponds to a pair of the preference value and the reference value; and a meta-data generating unit, which generates preference meta-data having at least one feature block for the preference value data and reference value data generated in the color characteristic calculating unit, wherein the feature block comprises:

a block header including a feature identifier corresponding to information identifying a color characteristic and a Bin number indicating a quantization level of the characteristic value, the color characteristic being at least one of color temperature, brightness, contrast, and saturation, wherein a contrast value is determined as a standard deviation of luminance values of all pixels in the image to be displayed; and at least one feature descriptor including the preference value and the reference value as values of the identified color characteristic for the preference image and the reference image, respectively.

21. The apparatus of claim 20, further comprising a first sample image obtaining unit, which sets an image that the user has selected from a plurality of images having different color characteristic values with respect to a predetermined image, sets an original image with respect to the preference image as a reference image, generates preference image data and reference image data which correspond to a pair of the preference image and the reference image, and outputs the pair to the color characteristic calculating unit.

22. The apparatus of claim 21, wherein the generating preference image data and reference image data is, when the reference image has a contents identifier, generating preference image data, reference image data and contents identifier data, wherein the contents identifier data correspond to a combination of the preference image, the reference image, and contents identifier information.

23. The apparatus of claim 22, wherein the color characteristic calculating unit, when the reference image has a contents identifier, further comprises a contents identifier in the preference value data and reference value data and generates a combination preference value data, reference value data and contents identifier data.

24. The apparatus of claim 20, further comprising a second sample image obtaining unit, which, when a unit for controlling a color characteristic of an image is installed in an image display device, sets an image of which color characteristic is adjusted by a user using the unit for controlling a color characteristic, as a preference image, sets an original image of which color characteristic is not adjusted by the user, as a reference image, generates preference image data and reference image data, which correspond to a pair of the preference image and the reference image, and outputs the pair to the color characteristic calculating unit.

25. The apparatus of claim 20, wherein the color characteristic calculating unit comprises a color temperature value calculating portion, which obtains a color temperature value, and wherein the color temperature value calculating portion comprises:

a highlight detecting part, which extracts a highlight region from an input color image;

a highlight variable calculating part, which projects the highlight region on a chromaticity coordinate and calculates geometric representation variables with respect to a shape distributed on the chromaticity coordinate;

a color temperature estimating part, which estimates a color temperature from the input color image by perceptive light source estimation; and a color temperature calculating part, which selects geometric representation variables around the estimated color temperature from the geometric representation variables and calculates a final color temperature using the selected geometric representation variables.

26. The apparatus of claim 20, wherein the color characteristic calculating unit comprises a brightness value calculating portion, which obtains luminance Y of each pixel in a YCbCr color space from an RGB value of a pixel in the image and generates a value obtained by adding luminance of the pixels and dividing the added luminance by the number of pixels, as a brightness value, and wherein the luminance Y of the pixel is determined by $Y=0.299 \times R+0.587 \times G+0.114 \times B$.

27. The apparatus of claim 20, further comprising a meta-data updating unit, which compares the preference value data and reference value data generated in the color characteristic calculating unit with an existing preference value and reference value data, updates the preference value data and reference value data, and outputs the pair to the meta-data generating unit, wherein the updating is, with respect to one preference value, when the reference value generated in step (b) is compared with the existing reference value and is the same as or similar to the existing reference value, removing the existing reference value, and the updating is, when quantization levels of the two reference values are different, converting a value of high level into a value of low level and comparing with each other, and when image contents identifiers are added to the characteristic value pairs, even though the two reference values are the same as or similar to each other, if the image contents identifiers are different, without removing the existing reference value.

28. The apparatus of claim 20, wherein the block header of the feature block further comprises a number-of-descriptors value indicating the number of feature descriptors contained in the feature block.

29. The apparatus of claim 20, wherein the feature descriptor further comprises:

a contents ID flag indicating the presence of an image contents identifier; and a the contents identifier if the image contents identifier exists.

30. An apparatus for generating user preference data regarding a color characteristic of an image, wherein a preference image comprises an image converted to have a color characteristic that a user prefers with respect to a predetermined reference image, a preference value comprises a color characteristic value of the preference image and a reference value comprises a color characteristic value of the reference image, the apparatus comprising:

a color characteristic calculating unit, which obtains an image color characteristic value of the preference image and the reference image, and generates a characteristic value pair preference value data and reference value data, which correspond to a pair of the preference value and the reference value, wherein the color characteristic calculating unit comprises a saturation value calculating portion, which obtains saturation of each pixel in a HSV color space from an RGB value of a pixel in the image and generates a value obtained by adding saturation of the pixels and dividing the added saturation by the number of pixels, as a saturation value, and wherein the saturation of the pixel is determined by the following steps comprising:

obtaining maximum and minimum values of the RGB value of the pixel, and when the maximum value is equal to 0, setting the saturation of a corresponding pixel to 0, and when the maximum value is not equal to 0, setting a value obtained by dividing a difference between the maximum value and the minimum value by the maximum value, as the saturation of a corresponding pixel; and a meta-data generating unit, which generates preference meta-data having at least one feature block for the preference value data and reference value data generated in the color characteristic calculating unit, wherein the feature block comprises:

a block header including a feature identifier corresponding to information identifying a color characteristic, the color characteristic being at least one of color temperature, brightness, contrast, and saturation, and at least one feature descriptor including the preference value and the reference value as values of the identified color characteristic for the preference image and the reference image, respectively.

31. An apparatus for generating user preference data regarding a color characteristic of an image, wherein a preference image comprises an image converted to have a color characteristic that a user prefers with respect to a predetermined reference image, a preference value comprises a color characteristic value of the preference image and a reference value comprises a color characteristic value of the reference image, the apparatus comprising:

a color characteristic calculating unit, which obtains an image color characteristic value of the preference image and the reference image, and generates a characteristic value pair, wherein the characteristic value pair includes preference value data and reference value data which correspond to a pair of the preference value and the reference value, wherein the color characteristic calculating unit comprises a contrast value calculating portion, which, when Yx is luminance of each pixel in the image and NumberofPixels is the number of pixels in the image, calculates a contrast value determined using the following equation:

$$CV = \sqrt{\left[\sum_{x \in (pixels)} (Y_x - BV)^2\right] / NumberOfPixels} \text{; and}$$

a meta-data generating unit, which generates preference meta-data having at least one feature block for the pair preference value data and reference value data generated in the color characteristic calculating unit, wherein the feature block comprises:

a block header including a feature identifier corresponding to information identifying a color characteristic, the color characteristic being at least one of color temperature, brightness, contrast, and saturation; and at least one feature descriptor including the preference value and the reference value as values of the identified color characteristic for the preference image and the reference image, respectively.

32. An image preference data recording medium on which is recorded preference meta-data for a generated characteristic value pair preference value data and reference value data which correspond to a pair of a preference value and a reference value, wherein a preference image comprises a reference image converted to have a color characteristic that a user prefers, the reference image comprises the predetermined image, the preference value comprises a color characteristic value of the preference image, and the reference value comprises a color characteristic value of the reference image, the preference meta-data having at least one feature block, the feature block comprising:

a block header including a feature identifier corresponding to information identifying a color characteristic and a Bin number indicating a quantization level of the characteristic value, the color characteristic being at least one of color temperature, brightness, contrast, and saturation, wherein a contrast value is determined as a standard deviation of luminance values of all pixels in the image to be displayed; and at least one feature descriptor including the preference value and the reference value as values of the identified color characteristic for the preference image and the reference image, respectively.

33. The recording medium of claim 32, wherein the block header of the feature block further comprises a number-of-descriptors value indicating the number of feature descriptors contained in the feature block, and wherein the feature descriptor further comprises:

a contents ID flag indicating the presence of an image contents identifier; and a contents identifier if the image contents identifier exists.

34. A computer readable recording media on which a program code is recorded to execute the method of claim 1.

* * * * *

UNITED STATES PATENT AND TRADEMARK OFFICE
CERTIFICATE OF CORRECTION

PATENT NO. : 7,606,412 B2 Page 1 of 1
APPLICATION NO. : 10/733388
DATED : October 20, 2009
INVENTOR(S) : Huh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Fourteenth Day of December, 2010

David J. Kappos
*Director of the United States Patent and Trademark Office*